US006827364B1

(12) United States Patent
Martin

(10) Patent No.: US 6,827,364 B1
(45) Date of Patent: Dec. 7, 2004

(54) PERSONAL UTILITY CART

(76) Inventor: Christopher Martin, 400 Argyle Rd., #LE-2, Brooklyn, NY (US) 11218

( * ) Notice: Subject to any disclaimer, the term of this patent is extended or adjusted under 35 U.S.C. 154(b) by 72 days.

(21) Appl. No.: 10/317,374

(22) Filed: Dec. 11, 2002

(51) Int. Cl.$^7$ ............................................. B62B 1/00
(52) U.S. Cl. ............................. 280/641; 280/DIG. 4; 280/651
(58) Field of Search ................................ 280/641, 642, 280/645, 646, 649, 652, 654, 651, 655, 659, 47.26, 47.34, 5.2, 30, DIG. 4, 655.1, 651.1, 47.371; 188/19, 21, 22, 29

(56) References Cited

U.S. PATENT DOCUMENTS

| | | | | |
|---|---|---|---|---|
| 1,829,629 A | * | 10/1931 | Betancourt | 280/655.1 |
| 2,738,984 A | * | 3/1956 | Korchan | 280/652 |
| 2,901,262 A | * | 8/1959 | Berlin | 280/641 |
| 2,920,900 A | * | 1/1960 | Best | 280/652 |
| 3,514,123 A | * | 5/1970 | Injeski | 280/652 |
| 3,774,929 A | * | 11/1973 | Stanley | 280/641 |
| 4,185,848 A | * | 1/1980 | Holtz | 280/652 |
| 4,339,141 A | * | 7/1982 | Thiboutot | 280/652 |
| 5,294,158 A | * | 3/1994 | Cheng | 280/641 |
| 5,816,604 A | * | 10/1998 | Hsieh et al. | 280/655.1 |
| 5,906,383 A | * | 5/1999 | Cortes | 280/47.371 |

* cited by examiner

Primary Examiner—Hau Phan

(57) ABSTRACT

A utility cart with the improvements including an adjustable height handle, a foot activated brake, an adjustable cart partition, and easy turning swivel front wheels to assist in guiding the cart. An inverted U-shaped telescoping handle, which curves outwardly from the backside of the cart is easily adjustable for desired height. A foot-activated brake mechanism is used to apply pressure to rather large, rubber tread wheels to prevent the cart from rolling when stopped on an inclined surface. An additional foot-activated lever is used to release the brake. Three embodiments of the utility cart are disclosed, these being (1) a rigid cart for general use, (2) a collapsible cart for storing, and (3) a low profile portable cart for fitting into the trunk of a car.

20 Claims, 3 Drawing Sheets

PERSONAL UTILITY CART

BACKGROUND OF THE INVENTION

1. Field of the Invention

The present invention relates to a utility cart for use in connection with shopping, laundering, and home utilization. The utility cart has significant improvements to conventional shopping carts in the areas of safety, maneuverability, convenience, and ease of use.

2. Description of the Prior Art

Shopping carts are used by practically everyone who shops. These cart come in all shapes and sizes and are particularly useful when shopping for groceries, clothing, etc. However, these carts often are found to lack desirable safety, maneuverability, convenience features, and at times are difficult to use. Such carts are also very useful for laundering, yard work, and many other jobs around the home.

The use of shopping carts are known in the prior art. For example, U.S. Pat. No. 5,915,723 to Austin discloses a collapsible utility cart that folds up for storage purposes. However, the Austin '723 patent does not have a brake mechanism for securing the cart, and has further drawbacks of not having swivel wheels for ease of maneuverability.

U.S. Pat. No. 5,294,158 to Cheng discloses a collapsible handcart that also collapses for storage purposes. However, the Cheng '158 patent does not have a brake mechanism for securing the cart, and has a further drawback of not having swivel wheels for ease of maneuverability.

Similarly, U.S. Pat. No. 5,906,383 to Cortes discloses a low profile home shopping cart with a pivotal handle, which allows the cart to be stored in the trunk of a car. However, the Cortes '383 patent does not have a telescoping handle that can be easily adjusted to fit the user, and has only a single wheel locking brake mechanism.

Also, U.S. Pat. No. 3,774,929 to Stanley discloses a shopping cart. However, the Stanley '929 patent does not disclose a brake mechanism or an adjustable handle.

Lastly, U.S. Pat. No. 5,383,536 to Butter et al. and Design Pat. No. D286,218 to Friedman may be pertinent to the construction and design of the invention. However, the Butter '536 discloses only a wheel brake for a shopping cart and the Friedman '218 does not disclose the utility of the shopping cart, but only the design.

While the above-described devices fulfill their respective, particular objectives and requirements, the aforementioned patents do not describe a utility cart that provides desirable safety, maneuverability, and adjustable handle features.

Therefore, a need exists for a new and improved utility cart that can be used for shopping, laundering, and other tasks around the home. In this regard, the present invention substantially fulfills this need. In this respect, the personal utility cart according to the present invention substantially departs from the conventional concepts and designs of the prior art, and in doing so provides an utility cart primarily developed to provide the safety of brakes, the maneuverability offered by swivel wheels, and the efficiency of an adjustable height handle.

SUMMARY OF THE INVENTION

In view of the foregoing disadvantages inherent in the known types of shopping carts now present in the prior art, the present invention provides an improved utility (shopping) cart, and overcomes the above-mentioned disadvantages and drawbacks of the prior art. As such, the general purpose of the present invention, which will be described subsequently in greater detail, is to provide a new and improved utility cart that has all the advantages of the prior art mentioned heretofore and many novel features that result in a utility cart, which is not anticipated, rendered obvious, suggested, or even implied by the prior art, either alone or in any combination thereof.

To attain this, the present invention essentially comprises a utility cart similar to those found in grocery and other chain stores, but with improvements including a adjustable height handle, a foot activated brake, an adjustable cart partition, and easy turning swivel front wheels to assist in guiding the cart. The cart has larger, more stable rear wheels with rubber treads rotatively mounted on an axle that extends across the lower back edge of the cart, with the wheel extending out to the side of the cart. Smaller individual mounted front swivel wheels, also with rubber treads, are attached to the front bottom corners and used to assist in turning the cart. Tubular handle supports extend upward at the top rear corners of the cart to support an inverted U-shaped handle, which curves outwardly from the backside of the cart. The handle has a telescoping adjustment means, which can be easily and quickly locked to a comfortable height for an individual. A brake mechanism is comprised of a horizontal bar, with brake pads mounted at each end and aligned to and in close proximity to the larger rear wheels, which is rotatively mounted and spring loaded on the axle. A longitudinal foot pedal attached between the rear wheels to the horizontal brake bar is used to set the brake. Finally a foot activated lever incorporated in the brake mechanism and extending outward from one side of the axle is used for releasing the brake.

The sides and bottom of the utility cart of the present invention are made from chrome plated steel mesh or equivalent. Optionally, the sides and bottom can be fabricated from a solid material for use in hauling dirt, grass, leaves, and other granular materials. The utility cart can be made in various sizes and is generally rectangular or square in shaped. Three embodiments of the utility cart are disclosed, these being (1) a rigid cart for use at a single location, (2) a collapsible portable cart for storing, and a low profile cart for fitting into the trunk of a car.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new utility cart that provides in the apparatuses and methods of the prior art some of the advantages thereof, while simultaneously overcoming many of the disadvantages normally associated therewith.

It is another object of the present invention to provide a new and improved utility cart that may be easily and efficiently manufactured and marketed.

An even further object of the present invention is to provide a new and improved utility cart that has a low cost of manufacture with regard to both materials and labor, and which accordingly is then susceptible of low prices of sale to the consuming public, thereby making such utility carts economically available to the buying public.

Still another object of the present invention is to provide a personal utility cart that is safer due to the added brakes, which prevent the cart from rolling into someone or some other object when stopped on an inclined surface.

Even still another object of the present invention is to provide a personal utility cart with greater control and ease of maneuverability.

Still yet another object of the present invention is to provide a personal utility cart, which makes it easier to transport groceries, laundry, lawn supplies, etc. and is convenient, adjustable, lightweight, and durable for years of effective use.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Figure 1:
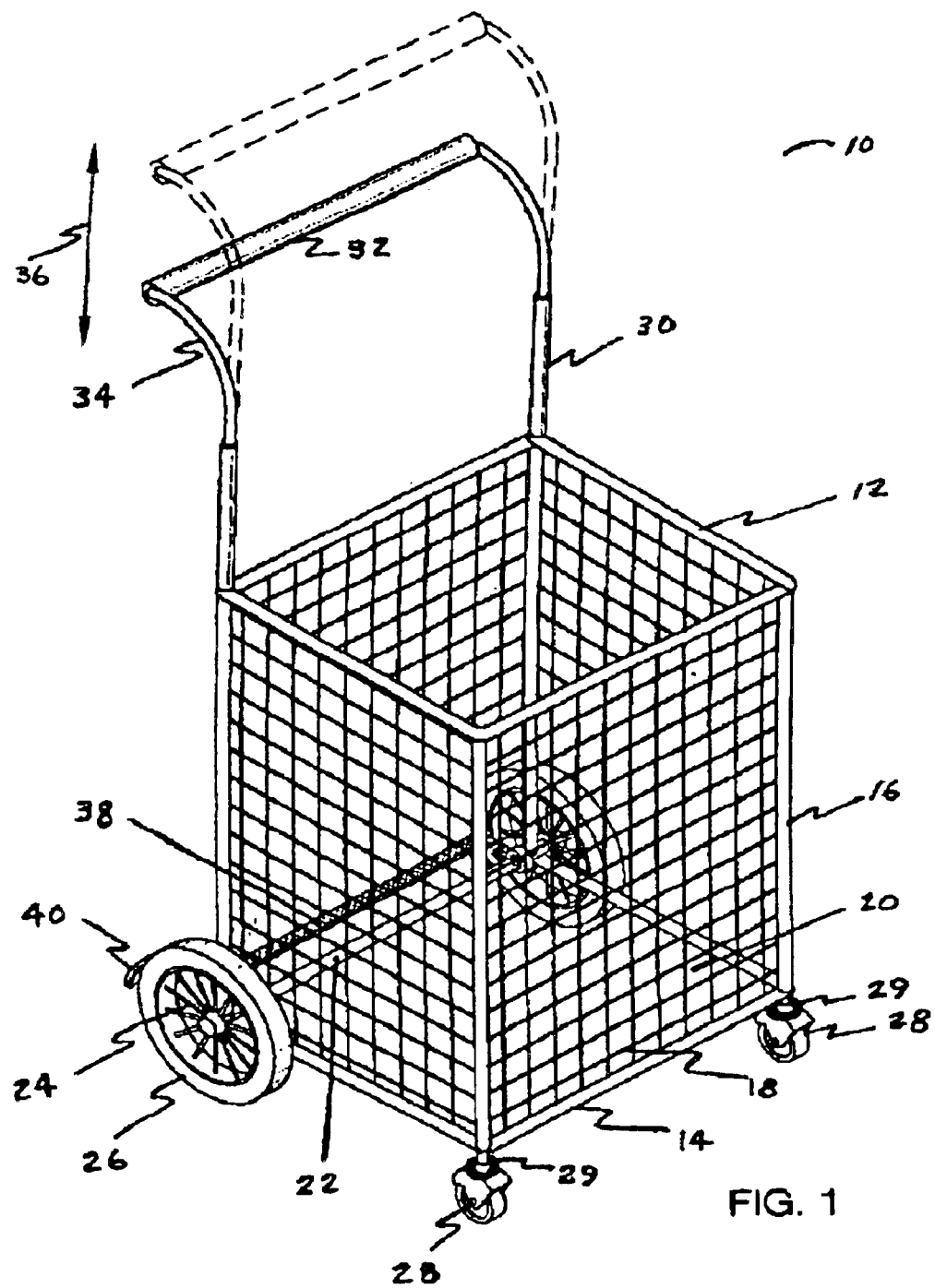
FIG. 1 is a perspective view of the preferred embodiment of the personal utility cart constructed in accordance with the principles of the present invention.

Referring now to the drawings, and particularly to FIGS. 1–4 a preferred embodiment of the personal utility cart of the present invention is shown and generally designated by the reference numeral 10.

In FIG. 1, a new and improved utility cart 10 of the present invention for shopping, laundering, or use around the home is illustrated and will be described. More particularly, the utility 10 has a metal volumetric frame comprised of an upper rectangular (or square) shaped frame rail 12 and a lower frame rail 14 connected at the four corners by corner support posts 16. The side panels 18 and bottom panel 20 of the cart are generally made of a metal mesh, although they can be solid depending on the intended application of the cart. The top of the cart remains open. The cart has two rather large (6-inches in diameter or greater, although they can be any desirable size) fixed (non-swivel) rear wheels 24, with rubber treads 26, rotatively mounted at each end of an axel 22, which runs along the lower back frame member of the cart and extends out at each side of the cart 10. This positions the rear wheels 24 to the lower back outer sides of the cart. Rotatable wheels 28, having built-in swivels 29, are mounted at the two front corners of the cart 10 to provide assistance in turning the cart. These swivels 29, commonly called swivel casters, allow the front wheels to freely rotate and thereby steer the cart. An adjustable handle 32 is attached along the upper back edge of the cart by means of two hollow handle support posts 30, which extend upward from the cart. The inverted U-shaped handle 32 has telescoping support tubes 34 that slide concentrically inside the handle support posts 30. A locking means holds the handle at a desired height. The horizontal portion of the handle 32 is constructed from metal, plastic, hard rubber, or other moldable material, which can be formed to comfortably fit the cart user's hands. The cart handle 32 can be adjusted (raised or lowered) over a range 36 (distance) of 12-inches or more to place it at a safe and comfortable position for an individual. A horizontal brake bar 38, which has brake pads 40 mounted at each end, is rotatively attached to the axel 22 so as to align the brake pads 40 with the rubber treads 26 of the rear wheels 24.

Figure 2:
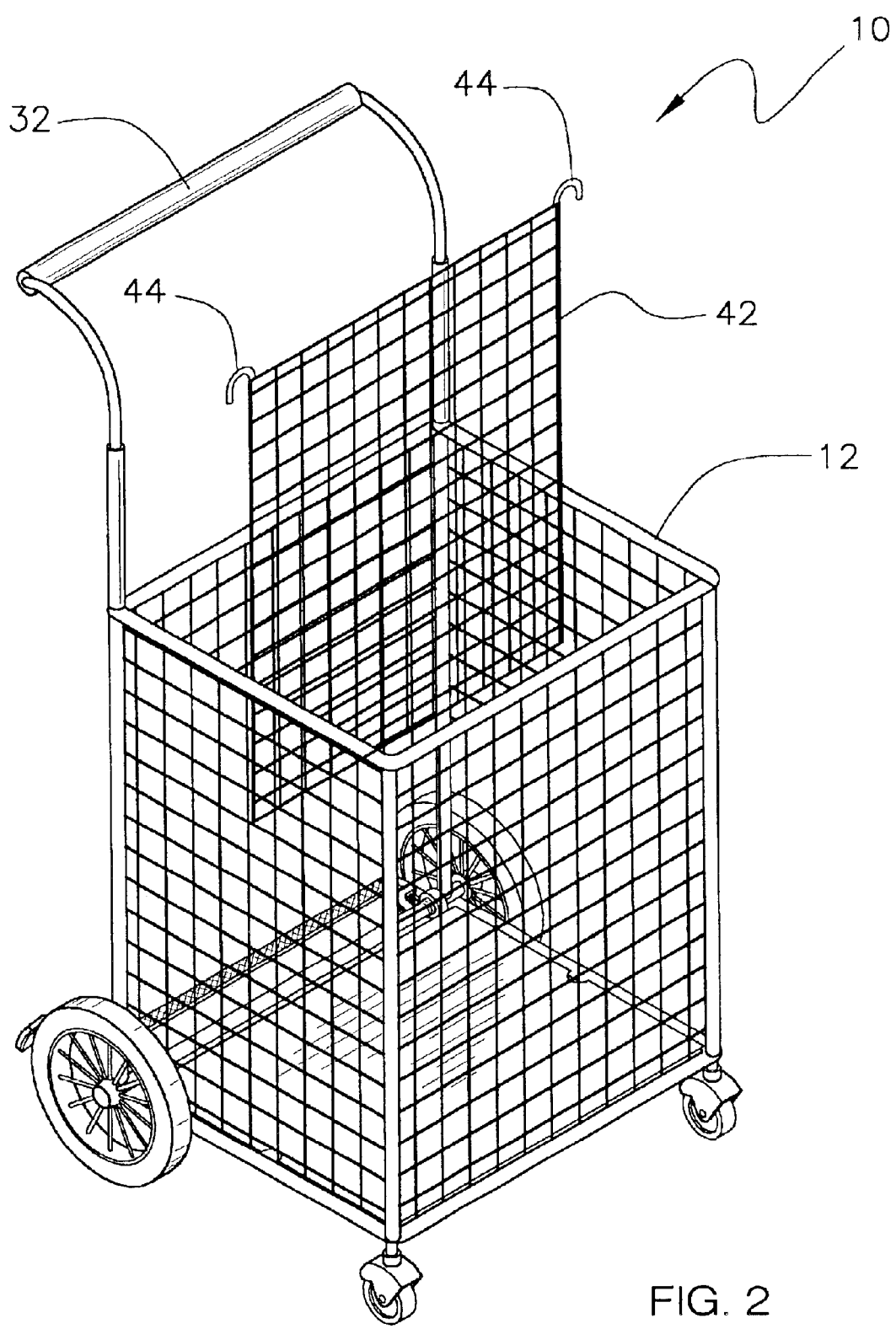
FIG. 2 is a perspective drawing of the personal utility cart of the present invention showing an adjustable storage divider fitted to the cart.

FIG. 2 shows the addition of an adjustable compartment divider 42, which can be inserted into the open top of the cart 10 and used to divide the cart into compartments. Multiple dividers 42 can be used as needed. The divider 42, which is typically made of the same material as the outer side panels 18 of the cart, has support hooks 44 that ride on the upper frame rail 12 to hold the divider securely in place.

Figure 3:
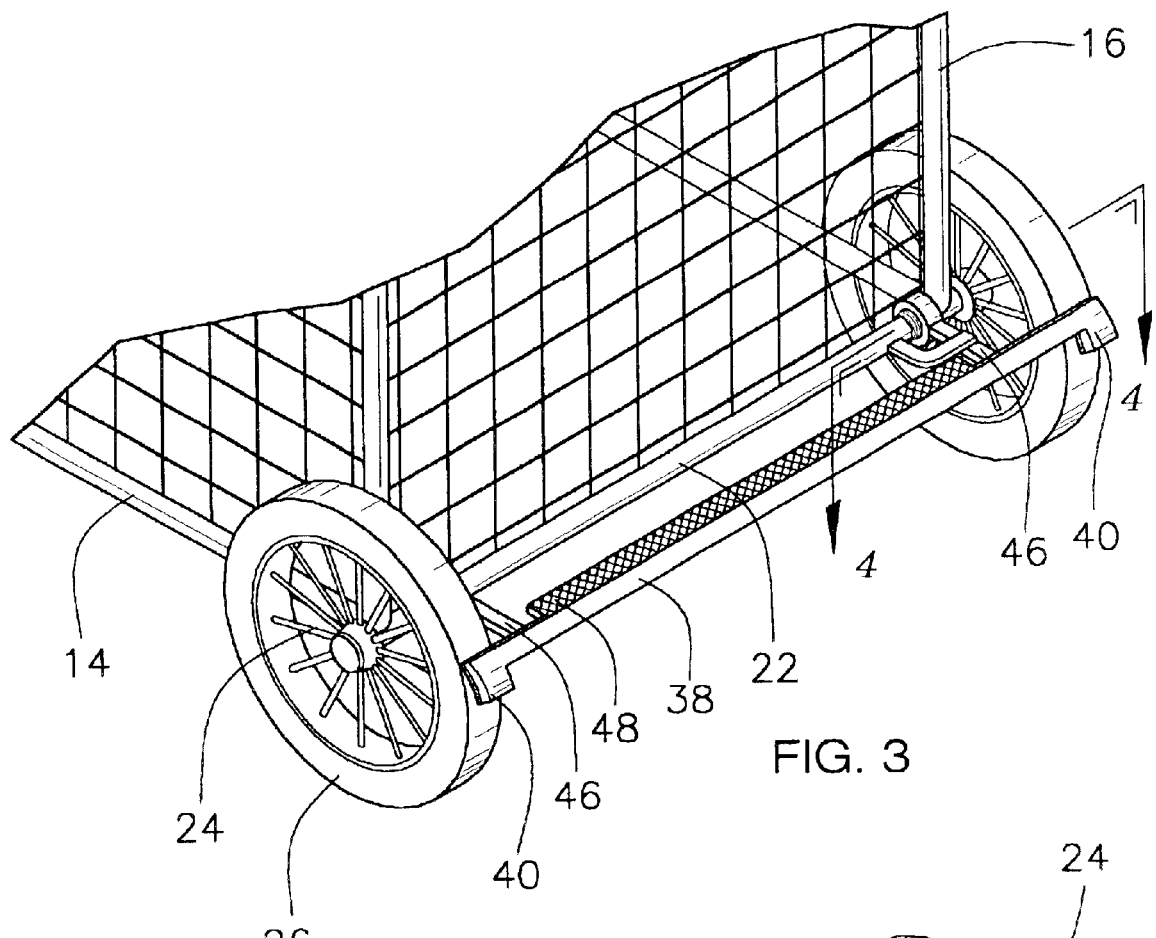
FIG. 3 is a drawing showing the brake mechanism of the personal utility cart of the present invention.

FIG. 3 is a drawing showing details of the brake mechanism of the personal utility cart of the present invention. This shows the rear wheels 24 with rubber treads 26 mounted on each end of the axle 22 that runs along the bottom back edge of the cart frame. The brake bar 38, with brake pads 40 mounted at each end, is rotatively supported from the axle 22 by means of brake bar rotation arms 46. The brake bar has a horizontal footpad 48 mounted to the brake bar 38 in the area between the wheels.

Figure 4:
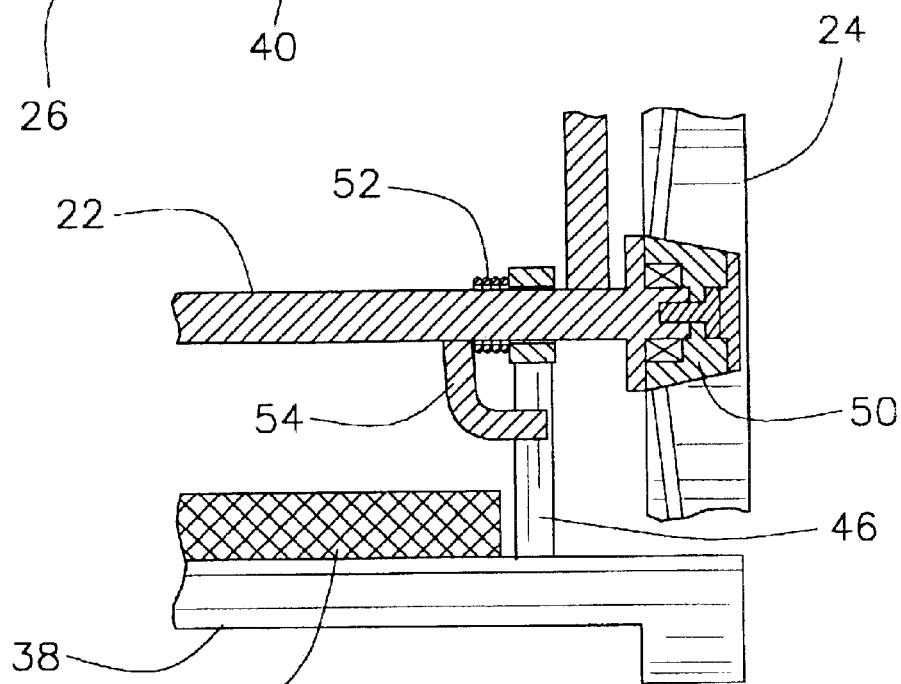
FIG. 4 is a drawing showing an expanded view around one wheel of the brake mechanism utilized in the shopping cart of the present invention.

FIG. 4 is a drawing showing an expanded view with further details around one wheel of the brake mechanism utilized in the shopping cart of the present. This shows the wheel 24 supported by a wheel hub 50, which is mounted to the end of the axle 22. The wheel hub houses a bearing or bushing means for smooth rotation of the rear wheels. The brake bar 38 is spring loaded, by means of spring 52, on the axle 22. A brake release lever 54 means is used to release the brake ratchet from the set position. In operation, the operator presses the horizontal foot pad 48 with his/her foot, forcing the brake pads 40 against the rear wheel treads 26. The brake is locked in place by a brake ratchet means, thereby holding the utility cart 10 in a given location. To release the brake, the operator presses the brake release lever 54 with his/her foot, thereby freeing the ratchet and allowing the spring loaded brake bar 38 to return to its rest (non-braking) position.

While a preferred embodiment of the personal utility cart has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, the cart can be made collapsible by providing pivotal arm means for folding up said cart for storing. Similarly, the vertical dimension (height) of the cart can be reduced to provide a low profile portable version, when the handle is lowered, for placement in the trunk of a car.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A utility cart for shopping, laundering, and transporting goods, comprising:
   a metal frame having a rectangular shaped upper frame rail, a rectangular shaped lower frame rail, said upper and lower frame rails being attached at the four corners by means of corner support posts, the four sides of said frame being closed by metal mesh panels, the bottom of said frame being further closed by a metal mesh panel, and the top of said frame being open;
   an adjustable inverted U-shaped handle attached along the back top portion of said frame, said handle supported by telescoping support posts having inner and outer concentric sliding tubes, said tubes extending upward from top of said frame, said inner tubes being curved outward from said cart, said handle being adjustable in height and secured in place by locking means;
   a rear axel attached horizontally to the back portion of the lower back frame rail, the ends of said axel extending outwardly from each side of said frame;
   fixed position rear wheels mounted on each end of said axel, said rear wheels having outer rubber treads for traction;
   rotatable front swivel wheels attached by mounting means to the front bottom corners of said frame, said front wheels having outer rubber treads for traction, said front swivel wheels providing means for turning said cart, thereby making said cart easier to guide;
   a brake mechanism further comprising brake pads attached by mounting means to each end of a horizontal braking bar, said braking bar being rotatively mounted and spring loaded on to said axel, said brake pads being made of a hard material having good griping properties, said braking bar extending across full width of said utility cart behind and in close proximity to said rear wheels, said brake pads being aligned with said rear wheels, said braking bar further having a horizontal footpad attached in area between said rear wheels for applying said brakes to secure said cart by applying frictional pressure to said rear wheels, said brakes being locked in place by ratchet means; and
   a brake release mechanism attached at one end of said axel near the rear wheel for releasing said brake mechanism, thereby freeing said rear wheels to rotate.

2. The utility cart of claim 1, further comprising an adjustable compartment divider, said divider having a metal frame and mesh surface, said divider capable of being dropped into said cart and positioned to partition said cart, said divider attached by means of hooks at the top corners of said divider and supported along the upper frame side rails of said cart.

3. The utility cart of claim 1, wherein said rear wheels have larger diameter than said front wheels, thereby providing stability to said cart.

4. The utility cart of claim 1, wherein said front swivel wheels have means for turning said cart, thereby making said cart easier to guide.

5. The utility cart of claim 1, wherein the bottom of said frame is closed by means of a solid panel.

6. The utility cart of claim 1, wherein said side panels of said cart are solid for use with granular materials such as used in lawn and garden applications.

7. The utility cart of claim 1, wherein the shape of said cart is square.

8. The utility cart of claim 1, wherein the height profile of said cart is made low, thereby providing a low-profile portable cart that can be stored in the trunk of a car, when said handle is lowered.

9. The utility cart of claim 1, wherein said brake release mechanism further comprises a foot activated lever extending from said brake mechanism for releasing said ratchet means.

10. The utility cart of claim 9, wherein said spring loaded brake bar returns to rest position when released, thereby releasing said brakes.

11. A collapsible utility cart, comprising:
   a metal frame having a rectangular shaped upper frame rail, a rectangular shaped lower frame rail, said upper and lower frame rails being attached at the four corners by means of corner support posts, the four sides of said frame being closed by metal mesh panels, the bottom of said frame being further closed by a metal mesh panel, and the top of said frame being open, said frame further having a pivotal arm means for folding up said cart for storing,
   an adjustable inverted U-shaped handle attached along the back top portion of said frame, said handle supported by telescoping support posts having inner and outer concentric sliding tubes, said tubes extending upward from top of said frame, said inner tubes being curved outward from said cart, said handle being adjustable in height and secured in place by locking means;
   a rear axel attached horizontally to the back portion of the lower back frame rail, the ends of said axel extending outwardly from each side of said frame;
   fixed position rear wheels mounted on each end of said axel, said rear wheels having outer rubber treads for traction;
   rotatable front swivel wheels attached by mounting means to the front bottom corners of said frame, said front wheels having outer rubber treads for traction, said front swivel wheels providing means for turning said cart, thereby making said cart easier to guide;
   a brake mechanism further comprising brake pads attached by mounting means to each end of a horizontal braking bar, said braking bar being rotatively mounted and spring loaded on to said axel, said brake pads being made of a hard material having good griping properties, said braking bar extending across full width of said utility cart behind and in close proximity to said rear wheels, said brake pads being aligned with said rear wheels, said braking bar further having a horizontal footpad attached in area between said rear wheels for applying said brakes to secure said cart by applying frictional pressure to said rear wheels, said brakes being locked in place by ratchet means; and a brake release mechanism attached at one end of said axel near the rear wheel for releasing said brake mechanism, thereby freeing said rear wheels.

12. The collapsible utility cart of claim 11, further comprising an adjustable compartment divider, said divider having a metal frame and mesh surface, said divider capable of being dropped into said cart and positioned to partition said cart, said divider attached by means of hooks at the top corners of said divider and supported along the upper frame side rails of said cart.

13. The collapsible utility cart of claim 11, wherein said rear wheels have larger diameter than said front wheels, thereby providing stability to said cart.

14. The collapsible utility cart of claim 11, wherein the bottom of said frame is closed by means of a solid panel.

15. The collapsible utility cart of claim 11, wherein said side panels of said cart are solid for use with granular materials such as used in lawn and garden applications.

16. The collapsible utility cart of claim 11, wherein the shape of said cart is square.

17. The collapsible utility cart of claim 1, wherein the height profile of said cart is made low, thereby providing a low-profile portable cart that can be stored in the trunk of a car, when said handle is lowered.

18. The utility cart of claim 11, wherein said brake release mechanism further comprises a foot activated lever extending from said brake mechanism for releasing said ratchet means.

19. The utility cart of claim 18, wherein said spring loaded brake bar returns to rest position when released, thereby releasing said brakes.

20. A personal utility cart, comprising:

a metal frame having a rectangular shaped upper frame rail, a rectangular shaped lower frame rail, said upper and lower frame rails being attached at the four corners by means of corner support posts, the four sides of said frame being closed by metal mesh panels, the bottom of said frame being further closed by a metal mesh panel, and the top of said frame being open;

an adjustable compartment divider, further comprising an adjustable compartment divider, said divider having a metal frame and mesh surface, said divider capable of being dropped into said cart and positioned to partition said cart, said divider attached by means of hooks at the top corners of said divider and supported along the upper frame side rails of said cart;

an adjustable inverted U-shaped handle attached along the back top portion of said frame, said handle supported by telescoping support posts having inner and outer concentric sliding tubes, said tubes extending upward from top of said frame, said inner tubes being curved outward from said cart, said handle being adjustable in height and secured in place by locking means;

rotatable front swivel wheels attached by mounting means to the front bottom corners of said frame, said front wheels having outer rubber treads for traction, said front swivel wheels providing means for turning said cart, thereby making said cart easier to guide;

a rear axel attached horizontally to the back portion of the lower back frame rail, the ends of said axel extending outwardly from each side of said frame;

fixed position rear wheels mounted on each end of said axel, said rear wheels having outer rubber treads for traction, said rear wheels having a larger diameter than said front wheels, thereby providing stability to the cart;

a brake mechanism further comprising brake pads attached by mounting means to each end of a horizontal braking bar, said braking bar being rotatively mounted and spring loaded on to said axel, said brake pads being made of a hard material having good griping properties, said braking bar extending across full width of said utility cart behind and in close proximity to said rear wheels, said brake pads being aligned with said rear wheels, said braking bar further having a horizontal footpad attached in area between said rear wheels for applying said brakes to secure said cart by applying frictional pressure to said rear wheels, said brakes being locked in place by ratchet means; and a brake release mechanism attached at one end of said axel near the rear wheel for releasing said brake mechanism, thereby freeing said rear wheels to rotate.

* * * * *